(12) United States Patent
Reynolds (10) Patent No.: US 11,907,169 B2
(45) Date of Patent: Feb. 20, 2024

(54) DELTA SET INFORMATION MANAGEMENT DEVICE AND SYSTEM

(71) Applicant: Steven Reynolds, Chicago, IL (US)

(72) Inventor: Steven Reynolds, Chicago, IL (US)

( * ) Notice: Subject to any disclaimer, the term of this patent is extended or adjusted under 35 U.S.C. 154(b) by 537 days.

(21) Appl. No.: 16/713,504

(22) Filed: Dec. 13, 2019

(65) Prior Publication Data

US 2021/0182242 A1 Jun. 17, 2021

(51) Int. Cl.
*G06F 16/174* (2019.01)
*G06F 16/17* (2019.01)
*G06F 16/176* (2019.01)
*G06F 16/13* (2019.01)

(52) U.S. Cl.
CPC .......... *G06F 16/1756* (2019.01); *G06F 16/13* (2019.01); *G06F 16/176* (2019.01); *G06F 16/1734* (2019.01)

(58) Field of Classification Search
CPC .... G06F 16/176; G06F 16/1756; G06F 16/13; G06F 16/9027; G06F 16/1873; G06F 16/1734
USPC ........................................................ 707/695
See application file for complete search history.

(56) References Cited

U.S. PATENT DOCUMENTS

| | | | | |
|---|---|---|---|---|
| 8,781,622 | B2 * | 7/2014 | Mockus | H04W 4/02 700/232 |
| 9,853,719 | B2 * | 12/2017 | Krochmal | H04W 12/033 |
| 11,522,700 | B1 * | 12/2022 | Auerbach | G06F 16/27 |
| 2006/0004703 | A1 * | 1/2006 | Spivack | G06F 16/958 |
| 2012/0072316 | A1 * | 3/2012 | Baumann | G06Q 10/10 705/30 |
| 2017/0039260 | A1 * | 2/2017 | Adya | G06F 16/27 |
| 2019/0370250 | A1 * | 12/2019 | Tipton | G06F 16/27 |
| 2020/0252406 | A1 * | 8/2020 | Padmanabhan | G06F 16/1834 |
| 2020/0311666 | A1 * | 10/2020 | Gray | G06F 16/1824 |

\* cited by examiner

*Primary Examiner* — Shahid A Alam (57) ABSTRACT

A delta set information management device (delta device) stores full versions of files and updates such files based upon delta information. The delta device can be a web server running delta software. It can store original files as either seed files or node files in a tree structure and store modifications to seed files and node files based upon the time and identity of the entity (e.g., user or computer) that requested or made such modifications.

18 Claims, 7 Drawing Sheets

| Nodes 420 | Messages 430 | Sent 440 | From 460 | To 480 |
|---|---|---|---|---|
| φD | Who can meet at 2:00? | φ | D | A,B,C,D,E,F |
| 10 D | I mean 3:00. | 10 | D | A,B,C,D,E,F |
|  | Who can meet at 2:00? | φ | D | A,B,C,D,E,F |
| 30 E | I can. | 30 | E | A,B,C,D,E,F |
|  | I mean 3:00. | 10 | D | A,B,C,D,E,F |
|  | Who can meet at 2:00? | φ | D | A,B,C,D,E,F |
| 40 F | Me too. | 40 | F | A,B,C,D,E,F |
|  | I can. | 30 | E | A,B,C,D,E,F |
|  | I mean 3:00. | 10 | D | A,B,C,D,E,F |
|  | Who can meet at 2:00? | φ | D | A,B,C,D,E,F |
| 50 A | Not me. | 50 | A | A,B,C,D,E,F |
|  | I mean 3:00. | 10 | D | A,B,C,D,E,F |
|  | Who can meet at 2:00? | φ | D | A,B,C,D,E,F |

Delta 10D.30E    String "I can."
Delta 30E.40F    String "Me too."
Delta φD.10D.30E    String "I mean 3.00.","I can."

DELTA SET INFORMATION MANAGEMENT DEVICE AND SYSTEM

BACKGROUND OF THE INVENTION

The present invention relates to a system that stores files and shares and updates files based upon delta sets.

The current system of file management is weighed down by redundancy. Storing, sorting, analyzing, and retrieving information is cumbersome. For example, often when a document file is modified, it is saved as another document or another version of the document. Similarly, every time an electronic (e.g., e-mail communication) is forwarded or replied to, the previous information is stored again-along with the new information—in the e-mail.

File management redundancy creates problems. For example, storage capacity decreases at a geometric rate as files are modified and stored as new files. Further, information is dispersed, as local users (human users or computer systems) often store separate versions locally. These first two examples often compound one another as files are modified and transmitted between users. Further, transmission of information is overburdened, because full files often must be transmitted to be shared and edited. Further, versioning of files can become complex without a means of tracking when changes were made. And, even if the timing of changes can be discerned, it is not always possible to determine what exact changes were made at each time. These issues, and more, would benefit from a device that stores full versions of files, distributes and controls access to those files, accepts modifications to those files without need of the full file being transferred, and can generate versioning history quickly and effectively.

BRIEF SUMMARY OF THE INVENTION

One or more of the embodiments of the present invention provide an information device ("delta device") that stores full versions of files and updates such files based upon delta information. In one embodiment, the delta device is a web server running delta software. The delta device stores original files as either seed files or node files. Seed files are original files, in their full form. Node files are full files that have been modified from previous seed files. The device also stores modifications to seed files and node files. In one embodiment, the delta device stores modifications to a seed file in a tree structure ("tree") based upon the time and identity of the entity (e.g., user or computer) that made the change. Each set (one or more) of changes is represented by a node in the tree. A "tree" is generally understood to include information stored in a set of nodes connected by lines. Often there is exactly one node having no incoming lines, called the "seed" or "root." Each node generally has exactly one incoming line. A previous node (or a "parent" of a node) is the node that is the source, either directly or through one or more lines, of its incoming line.

In one embodiment, the delta device sends seed files to one or more users. The delta device also receives, from the one or more users, delta information related to the seed file. The delta information includes identification ("ID") information identifying the seed file and change information. One example of change information is a set of tracked or redlined changes in a word processing document. Another example of change information is a file containing user input (e.g., from a keyboard and mouse). Another example of change information is the list of actions or functions performed by a user when modifying a file. Change information can be any information that identifies how a file was changed by a user, software, or system.

In one embodiment, each tree is rooted in a seed file. In one embodiment the delta device is capable of changing a node into a node file. The delta device does so by applying all changes described in the tree structure between the seed and a given node and storing that entire new file as a node file in the tree.

In one embodiment, the delta device controls access to files based upon user permissions. For example, the delta device may only accept changes to certain nodes at certain times, and/or by certain users.

In one embodiment, the delta device tracks all incoming delta information in a tree. The tree can either be linear, if delta information is received sequentially or if the delta device limits changes to the latest node. The tree can also include multiple branches if, for example, it receives changes to an older node after other changes have been made to such older node, thus creating a newer node or node file.

In one embodiment, the delta device can receive a full file, compare the full file to a seed file or node, and generate delta information that can be used to populate a tree. Alternatively, the delta device can store the full file as a node in a tree.

In one embodiment, the information in each node is stored as a transaction in a blockchain. In such cases, the full seed and node files can be stored in the chain or can be identified by an identifier or hash of the respective seed and node files.

In one embodiment, the delta device publishes a blockchain of all transactions associated with a file. In another embodiment, the delta device keeps the changes private (e.g., using public/private key or other type of encryption) to communicate secure delta information to one or more users without having to transfer entire files (e.g., seed files or node files). In other words, known encryption methods are used so that the delta information can be transmitted freely but cannot be deciphered or decoded without the required permissions. As a result, those desiring to communicate sensitive documents (or changes or revisions thereto) would not necessarily need a secure communication channel, since the file itself could be encrypted. That is not to say secure communication channels could not be used in the alternative.

In one embodiment, the delta device allows user access to images of files; e.g., via a web application. The delta device may allow users to identify changes to such files via the web application. For example, the delta device may provide a mere image of an office document with text overlay, allow the user to modify the text, and store the text modification as a node in the tree.

In one embodiment, the delta device optimizes change data in nodes to reduce the complexity of the change information by, for example, removing redundancy.

In one embodiment, the delta device invites one or more users to make changes to seed files, node files, or nodes. For example, the delta device may send full files or shortcut links to seed files, node files, or nodes. If a user seeks to change or access a node, the delta device will determine whether the user has custody of a seed file or node file that can be used, in conjunction with the delta information that connects the node to such seed file or node file, to rebuild a complete file according to the changes defined by the node. In one embodiment, the delta device creates invitations in a standard file system by placing icons on networked local computers of those individuals who have access to change it.

DETAILED DESCRIPTION OF THE INVENTION

Figure 1:
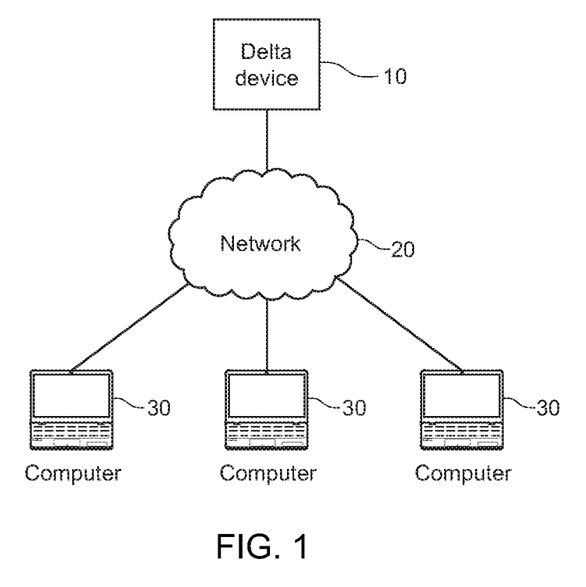
FIG. 1 illustrates the delta device when connected to one or more computers via a network FIG. 2 provides a graphical representation of a file tree structure containing file change information.

FIG. 1 illustrates the environment of a delta network device 10. In this embodiment, the delta network device is preferably a computing device (such as a server or computer) and is connected to one or more computers 30 via a network 20.

Figure 2:
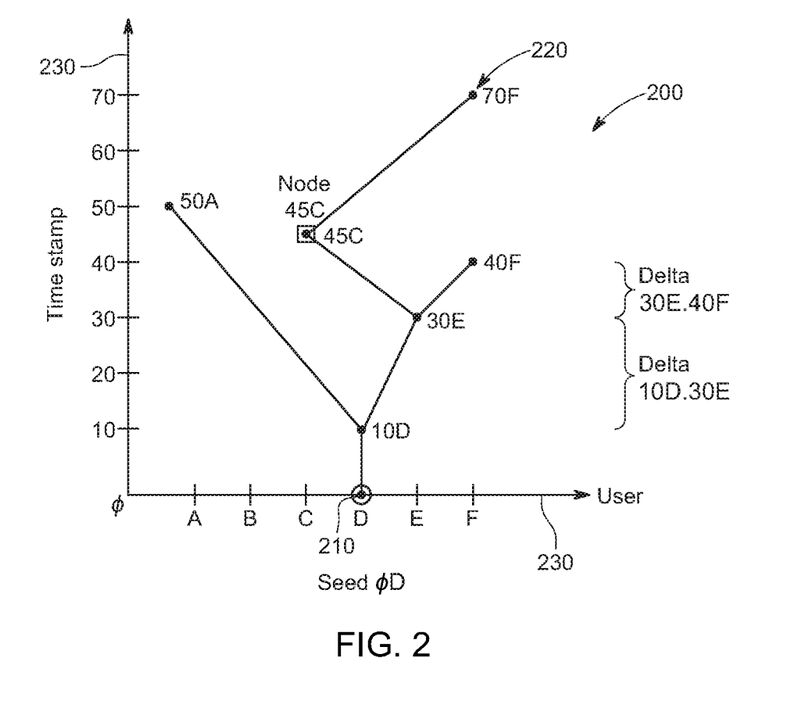

FIG. 2 illustrates a file tree structure 200. The file tree structure contains at least one seed, or original, node 210, which is preferably a complete file such as, for example, word processing document, spreadsheet, text file, image file, PDF file, presentation file, or any other stored collection of data. The nodes 210 are arranged along one or more dimensions 230, which define one or more criterion. FIG. 2 shows a 2-dimensional version of a file tree structure. It will be understood that the nodes could be arranged along any number of dimensions. In a preferred embodiment, there are at least two dimensions: one identifying users by a numerical or alphanumerical identifier and one identifying a time stamp, preferably using sequential numbering. In one embodiment, each node stores changes that could be made to at least one previous node to which it is connected to create a new or modified version of the file. As shown in FIG. 2, the identifiers for each dimension are preferably arranged such that the connection of the nodes can be described by a sequential concatenation of various other identifiers. A known example of such a method is used in Merkle trees, which will be known to one of skill in the art.

Figure 3:
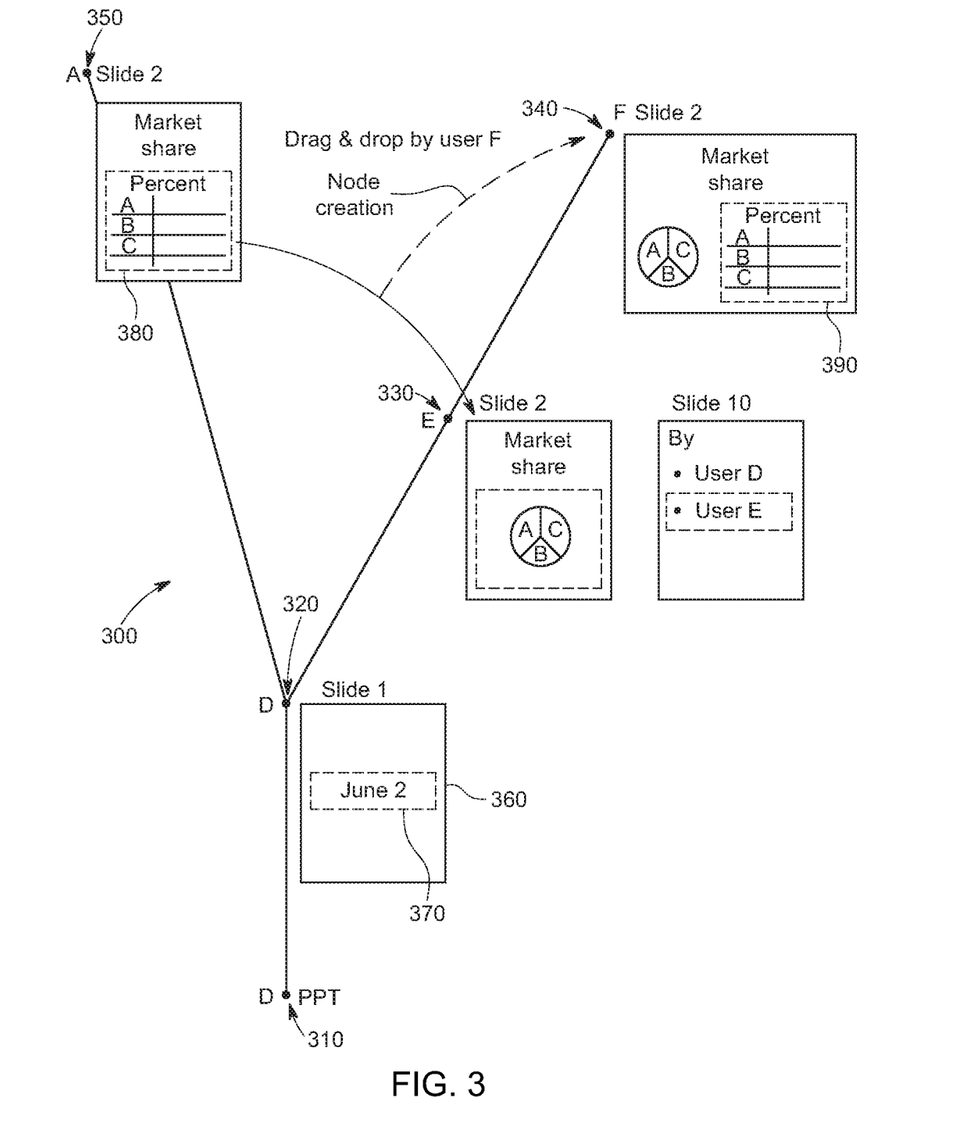
FIG. 3 illustrates one embodiment of a display of file change information contained in a tree structure of the form shown in FIG. 2.

FIG. 3 illustrates a graphical user interface ("GUI") 300 depicting change information stored in a tree structure of the form shown in FIG. 2. In the example shown in FIG. 3, the delta device stores an original slide presentation file created by user D and transferred to the delta device. That file is represented by an icon corresponding to node 310. The remaining nodes shown in FIG. 3 are change nodes, meaning they contain delta information identifying users and changes each user made to either the original slide presentation file or one of the nodes 320, 330, 340, and 350. In various alternative embodiments, a user can modify, for example, the file identified by node 320 in multiple ways. For example, a user could request that the delta server apply the changes in node 320 to the original slide presentation file to create a new, first modified presentation file and send the first modified presentation file to the user to be stored locally at the user computer. A user could also modify the first modified presentation file into a second modified presentation file; the user computer could track or redline the changes; and the user computer could then send a delta file to the delta device. The user could also send the second modified presentation file to the delta device. In alternative embodiments, the delta device can either store the second modified presentation file as a node file in the file tree (in which the entire file is stored in memory, in addition to the delta information) or run a comparison between the second modified presentation file and the first modified presentation file to create delta information, or utilize either at different times or according to user settings. It will be understood that, in this way, the user computer and the delta device have flexibility in creating and transmitting change information and/or files using other sets of change information and/or files.

In one embodiment, the GUI of FIG. 3 depicts images of changes made to the presentation file represented by each node. In one embodiment, only pages (or slides) containing changes are displayed. In another embodiment, the changes are identified to the user using a feedback; such as, for example, a dashed box 370, highlight, blinker, haptic, sound, or other feedback recognizable by a user. In another embodiment a user (e.g., user F) can click on a change (e.g., change 380) and drag it to a node (e.g., node 330) and thereby create a new change node (e.g., node 340). In such instances, the GUI displays the change via a feedback 390.

Figure 4:
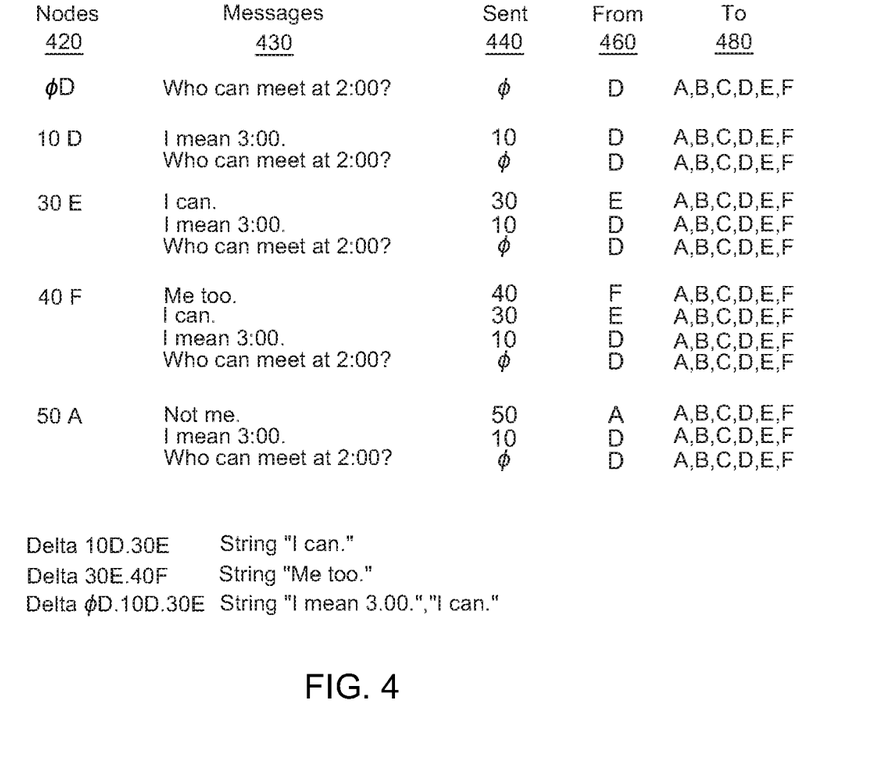
FIG. 4 illustrates one embodiment of a display of communication threads contained in a tree structure of the form shown in FIG. 2.
Figure 5:
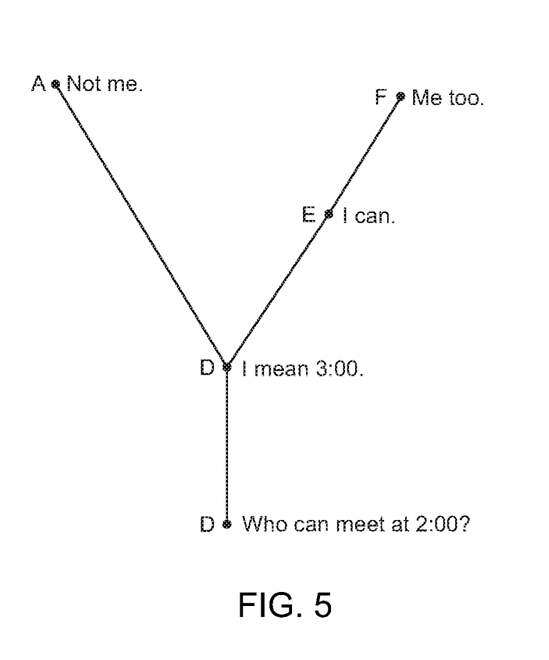
FIG. 5 illustrates another display of some of the information of FIG. 4.

FIG. 4 illustrates one embodiment of electronic communication information stored in a tree structure of the form shown in FIG. 2. FIG. 4 contains nodes 420, defined, for this example, in the same manner as the nodes 220 in FIG. 2. The delta device stores concatenated messages assembled using the change data according to each node. As can be seen in FIG. 4, user D sent an original message at time nought (θ) that asks "who can meet at 2:00?" User D responds to the same group at time 10 as follows: "I mean 3:00." User E responds to the group at time 30 as follows: "I can." The fully concatenated message sent by user E-such as would traditionally be included in an e-mail thread-contains each of the previous messages. In one embodiment, the delta information corresponding to node 30E is identified as θD.10D.30E, which explains how to concatenate the following strings: "Who can meet at 2:00?"+"I mean 3:00."+"I can." The delta device can make use of this information in several ways. For example, the delta device can create a GUI like that shown in FIG. 5—in which the redundant or cumulative information in each concatenated message is removed. As such, a user can review all the substance of a conversation without re-reading redundant or cumulative information. Alternatively, the delta device can re-create an electronic message conversation by, for example, printing each message separated by cascading headers as is known, for example, in Microsoft e-mail systems. The delta device of this embodiment thus has flexibility to reduce numerous e-mail communications to simplified text and/or to allow users to communicate securely by transmitting delta information instead of entire messages.

Figure 6:
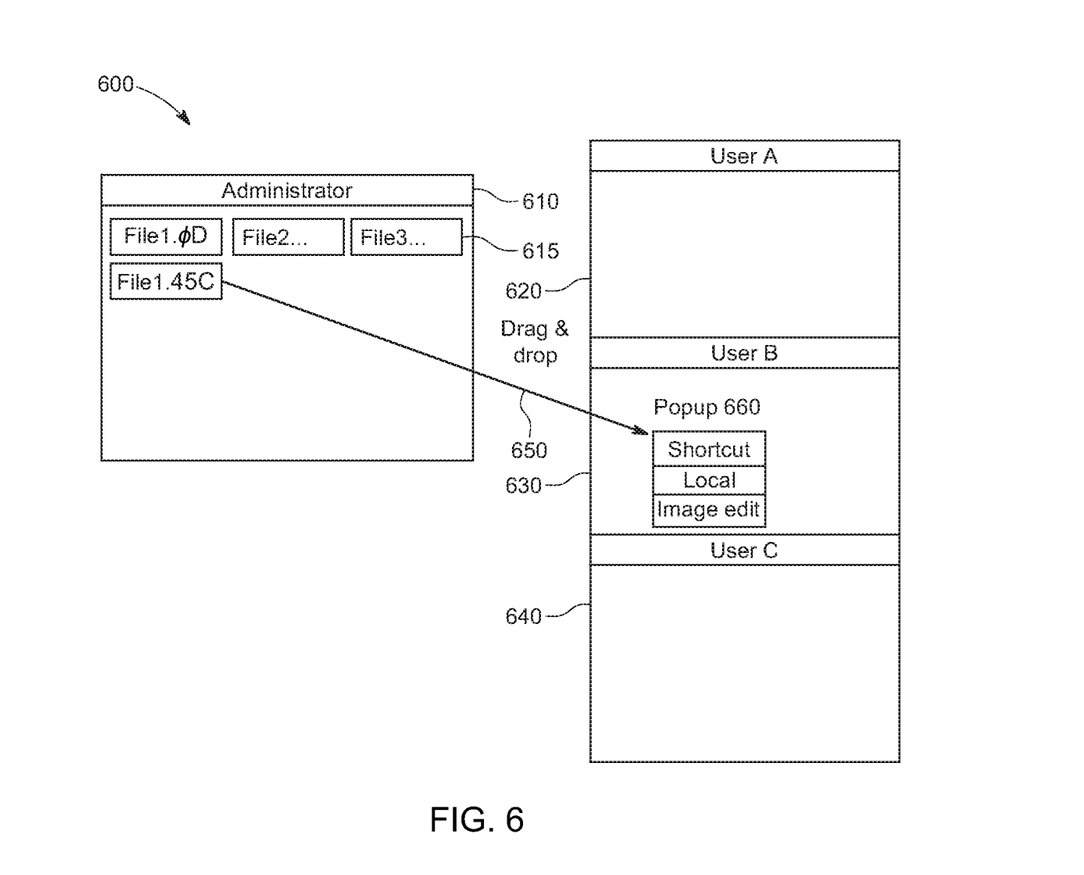
FIG. 6 illustrates a graphical user interface that an administrator of the delta device can use to distribute file access to one or more users.

FIG. 6 illustrates one embodiment of a GUI 600 for an administrator user of the delta device. The term "administrator" is used herein as an arbitrary designation to identify a different class of "user." Often administrators have more rights than normal users. But each term can be used interchangeably and should be understood to relate, in the broadest sense, to any individual or entity that is given access to the delta device. The windows 610, 620, 630, and 640 in the shown embodiment are similar to windows used in known operating systems. In one embodiment, the windows shown are file explorer windows. As shown, GUI depicts the administrator's local files and/or node information as icons 615 in file explorer window 610. The files in this embodiment contain text-based file names (e.g., File1, File2, File3) concatenated with node information (e.g., θD, 45C). As shown by drag-and-drop 650, the administrator can give User B access to File1.45C. In one embodiment, when the administrator drags and drops the icon representing File1.45C to the graphical representation of a file explorer window on User B's computer, a popup dialog 660 appears, which gives the administrator the option of placing a shortcut to the network file or node 45C, placing a local copy of the file or node on User B's computer, or providing User B a link to image-edit the file (as described in connection with FIG. 7). It will be understood that if node 45C contains only delta information (as opposed to a full file stored as a node file), either the delta device or User B's computer may have to concatenate the data to rebuild a file (either locally or via the network) for User B to edit.

Figure 7:
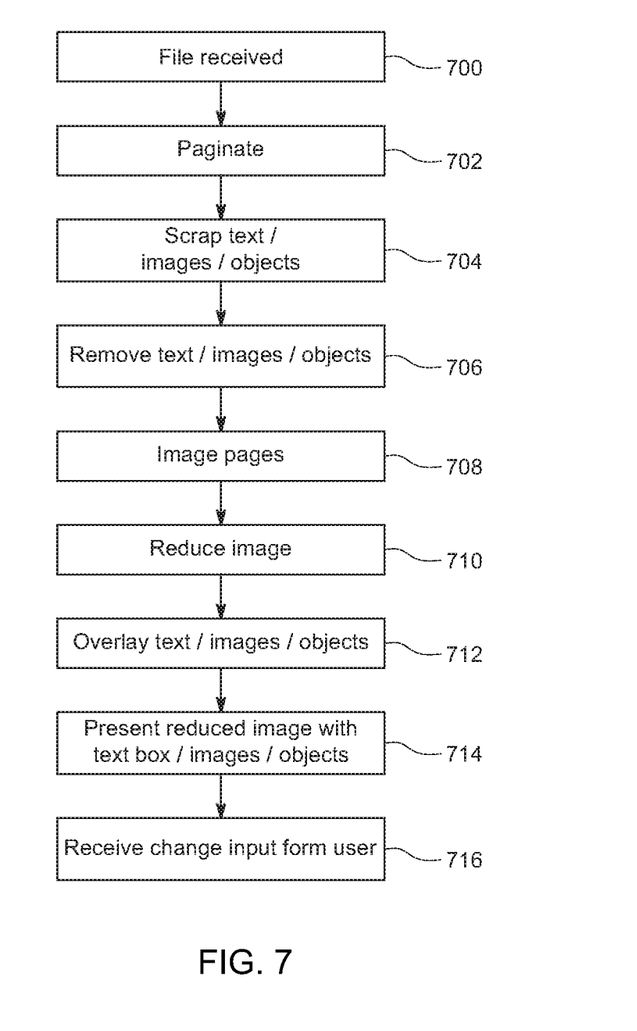
FIG. 7 is a flow chart demonstrating how files can be processed to be displayed for editing to a remote user.

FIG. 7 illustrates how files can be processed to be displayed for editing to a remote user in an efficient manner. In one embodiment, only certain aspects of the file-to-be-modified, which is stored locally with the delta device, is presented to the user-instead of transferring or giving access to the entire file. The process in FIG. 7 can be executed by a standalone computer or server, software processes routine, or any other macro, script, or process executed by a processor.

At step 700, a file is received. Optionally, the file is duplicated so that an original is stored along with the to-be-presented version. At step 702, the file is paginated. Often user files will already have some sort of pagination demarcated (e.g., pages in a word processing document or PDF, sheets or pages in a spreadsheet workbook, layers or views in a drawing file, distinct files in a larger set of files, rows or columns or sets of rows or columns in a database, different messages in a thread in e-mail, different channels in an electronic communication program, or any other split or partition in a file). The file is paginated using either extant splits or partitions in the file or in some other manner, which may be defined by a user or administrator. In a preferred embodiment, the pagination is determined based upon the amount of information that can be displayed, at a readable resolution, to a user. In some instances, the pagination will vary based upon the device (e.g., display screen size) of the user's device.

At step 704, text in the file is scraped by a known method, such as, for example, optical character recognition (OCR), type matching, correlation with a data file, or any other method of converting visual characters to known text. Optionally, images are also scraped. This can be done, for example, by replacing raster images with vector image equivalents, which are more easily edited by a user. Additionally, optionally, format or settings can be scraped by reading information related to objects in a file into memory. It should be understood that step 704 can encompass any method of converting portions of files that a user cannot easily modify or manipulate into a form that a user can modify or manipulate it (e.g., converting image text into text in a text box, converting an image of a circle into a drawing object, or converting an object that has a placement on the screen to an object and a separate memory or variable containing information about its place on the screen).

At step 706, one or more of the text, images, and/or objects are removed from the file. If any of the foregoing are were in image form before being scraped, they can be removed using known means of image editing, including blending, blurring, interpolating, among other processes.

At step 708, the pages are turned into discrete images, preferably but not necessarily, single layer images. For example, if the file is a word processor file, it can be formatted into single-page TIFFs.

At step 710, the images are reduced using known methods; e.g., decimated, down-sampled, or other process.

At step 712, one or more of the text, images, and/or objects are overlaid in approximately the same place they appeared, before being scraped, on the one or more paginated images.

At step 714, the images and overlaid information is presented to a user-preferably a remote user-who can edit at least the scraped information while viewing such information overlaid on, or near, the images.

At step 716, change input is received from a user. This can be via direct manipulation of the scraped information or other means such as, for example, tracking user keyboard and/or mouse inputs or any other means of a user conveying instructions regarding modification of the information being displayed.

What is claimed is:

1. A file control device including:
   a processor;
   memory; and
   software;
   wherein the file control device is configured to be connected to a network and wherein the software is configured to:
   establish a connection with one or more users over the network;
   share files or file information with the one or more users;
   receive from the one or more users (1) instructions relating to changes to be made to one or more files and (2) at least one value associated with each of at least two criteria related to the changes, where the values are created based upon information related to the instructions;
   create nodes based upon at least one value associated with each of at least two of the at least two criteria and upon the identity of the one or more files; and
   store the instructions as change information in at least one node of a tree structure that has at least two nodes, where the at least two nodes are arranged based upon at least one value associated with each of at least two of the at least two criteria and upon the identity of the one or more files.

2. The file control device of claim 1 further configured to allow a user to modify a file stored at the file control device whereby the user (1) modifies a file stored locally with the user that is substantially similar to the file stored at the file control device and (2) creates instructions relating to the user changes; and whereby the file control device (1) receives such instructions from the user and (2) stores the instructions as change information in a tree structure, specifically in a node that is connected, directly or indirectly, to a node corresponding to the file stored at the file control device.

3. The file control device of claim 2 further configured to receive the instructions in the form of a blockchain, or a portion of a blockchain, that contains one or more transactions and that stores one or more sets of change information as transactions.

4. The file control device of claim 1 wherein the criteria include at least a temporal criterion and a criterion related to the identity of a user that provided the change information.

5. The file control device of claim 1 further configured to modify files stored in memory of the file control device based upon the received change information.

6. The file control device of claim 1 further configured to allow a user to request the combination of two or more sets of change information stored in two or more nodes in the tree structure to create a new node.

7. The file control device of claim 1 further configured to control modifications to the tree structure based upon the identity of a user that submitted change information.

8. The file control device of claim 7 further configured to provide to a user a graphical user interface by which the user can control access to one or more nodes to other users using a drag and drop interface.

9. The file control device of claim 1 further configured to (1) store files as nodes in the tree structure and (2) convert nodes into node files by applying at least one set of change information to a file.

10. A method of controlling changes to files based upon change data using a centralized server connected to a network, the method including establishing a connection with one or more users over the network;
    sharing files or file information with the one or more users;
    receiving from the one or more users (1) instructions relating to changes to be made to one or more files and (2) at least one value associated with each of at least two criteria related to the changes, where the values are created based upon information related to the instructions;
    creating nodes based upon at least one value associated with each of at least two of the at least two criteria and upon the identity of the one or more files; and
    storing the instructions as change information in at least one node of a tree structure that has at least two nodes, where the at least two nodes are arranged based upon at least one value associated with each of at least two of the at least two criteria and upon the identity of the one or more files.

11. The method of claim 10 further including the step of allowing a user to modify a file by (1) receiving the instructions from the user and (2) storing the instructions as change information in a tree structure, specifically in a node that is connected, directly or indirectly, to a node corresponding to the file.

12. The method of claim 11 further including receiving the instructions in the form of a blockchain, or a portion of a blockchain, that contains one or more transactions and that stores one or more sets of change information as transactions.

13. The method of claim 10 wherein the receiving step includes receiving at least a temporal criterion and a criterion related to the identity of a user that provided the instructions.

14. The method of claim 10 further including the step of modifying files stored in memory based upon the received instructions.

15. The method of claim 10 further including the step of receiving instructions from a user to combine two or more sets of change information stored in two or more nodes in the tree structure to create a new node.

16. The method of claim 10 further including the step of controlling modifications to the tree structure based upon the identity of a user that submitted the instructions.

17. The method of claim 16 further including the step of providing to a user a graphical user interface by which the user controls access to one or more nodes to other users using a drag and drop interface.

18. The method of claim 10 further including the steps of (a) storing complete files as nodes in the tree structure and (b) converting nodes into node files by applying at least one set of change information to a file.

\* \* \* \* \*